Jan. 12, 1943. H. P. PHILLIPS 2,307,948
PISTON EXPANDER
Filed Feb. 12, 1942

INVENTOR.
Harold P. Phillips
BY
Earl D. Chappell

Patented Jan. 12, 1943

2,307,948

UNITED STATES PATENT OFFICE 2,307,948

PISTON EXPANDER

Harold P. Phillips, Hastings, Mich., assignor to Hastings Manufacturing Company, Hastings, Mich., a corporation of Michigan Application February 12, 1942, Serial No. 430,546

7 Claims. (Cl. 309—12)

This invention relates to improvements in piston expanders.

The main objects of this invention are:

First, to provide a piston expander which is well adapted for and effective in use in pistons having non-split piston skirts, particularly for cast iron and steel pistons although advantageous for use in aluminum or alloy pistons.

Second, to provide a piston expander comprising a pair of expander members each having a curved piston wall engaging portion at its outer end of substantial area and adapted for engagement with the piston wall axially thereof and having snubbing action with the wall, the members having frictional snubbing action with each other, the members being designed for supporting engagement with abutments such as the piston pin bosses commonly present in many pistons now in use.

Third, to provide a piston expander having these advantages which is easily installed and effectively retained in the cylinder.

Objects relating to details and economies of the invention will appear from the description to follow. The invention is defined in the claims.

A preferred embodiment of the invention is illustrated in the accompanying drawing, in which.

Figures 1, 2, 3:
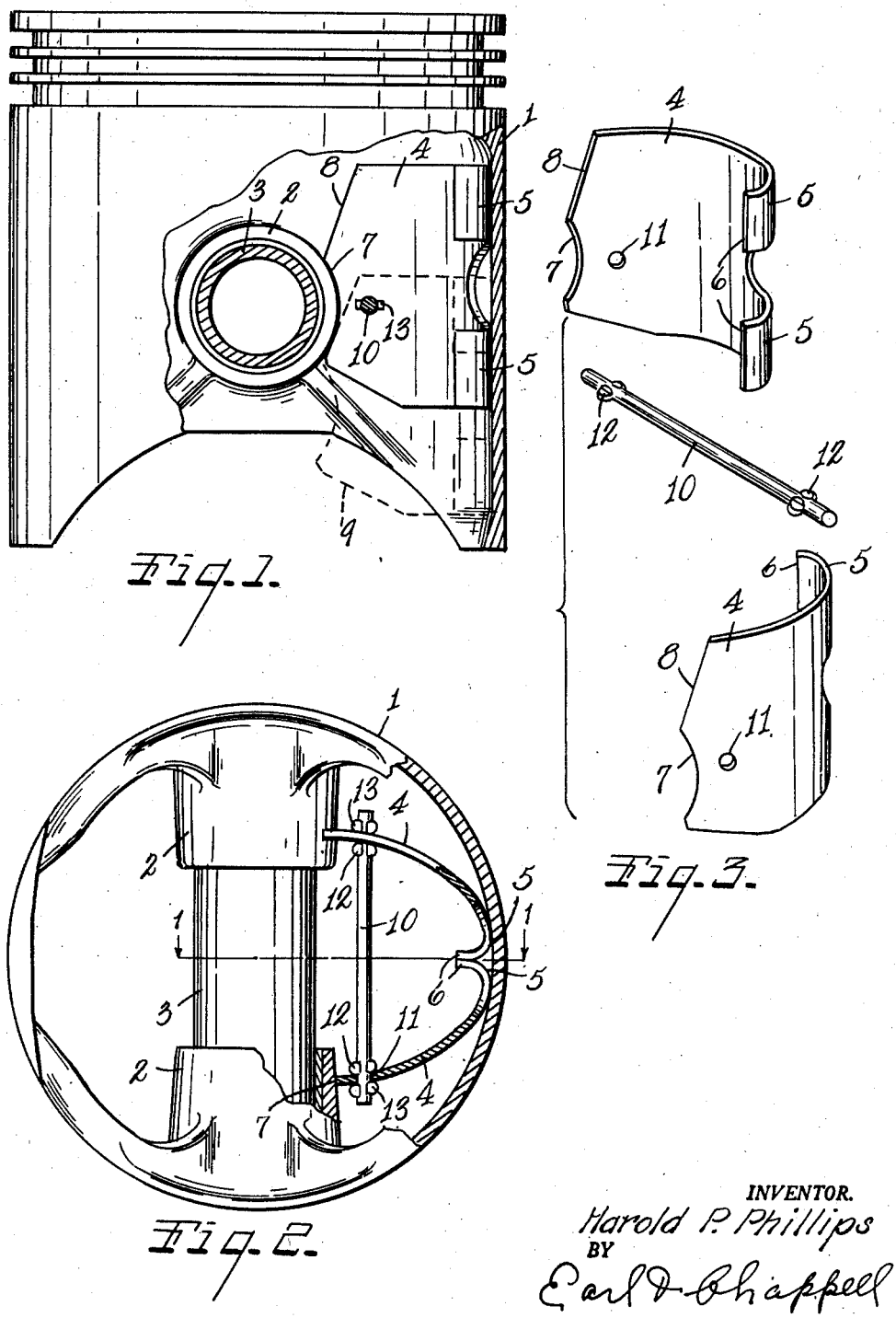
Fig. 1 is a fragmentary side elevation of a non-split skirt piston having one of my piston expanders installed thereon partially in longitudinal section on line 1—1 of Fig. 2.
Fig. 2 is an inverted fragmentary view of the assembly shown in Fig. 1 partially in transverse section.
Fig. 3 is a perspective exploded view of the three parts constituting the expander of my invention, as illustrated herein.

In the accompanying drawing, 1 represents an internal combustion engine piston of the non-split type, 2 the internal piston pin bosses, and 3 the piston pin. This piston illustrated is of a type widely used in which the walls of the skirt are not split but are relatively thin. I have not, however, attempted to show the parts in exact proportion.

The expander of my invention comprises a pair of relatively wide blade-spring expander members 4, 4, which are inwardly curved and provided with curved piston wall engaging portions 5 at their outer ends. These piston wall engaging portions are of substantial area and terminate in inturned web or flange-like portions 6 which are disposed in mutually abutting and supporting position and which lie in side by side frictional abutting relation.

The curved piston wall engaging portions 5 extend axially of the piston and engage the piston wall axially thereof. In the embodiment illustrated, the piston wall engaging portions extend nearly the full length of the piston skirt, as shown in Fig. 1.

On their inner edges, the expander members 4 have curved seats 7 of substantial depth adapted to receive the piston pin bosses 2 which serve as abutment members for the expander. The inner edges 8 above these abutment engaging seats 7 are inclined so that the members may be driven into position to engage their seats with the bosses, the initial position in inserting being indicated by dotted lines 9 in Fig. 1.

The members 4 are in general in inwardly diverging relation and to prevent slippage on the parts constituting the bosses therefor, I provide a tie rod or spacer member 10. This member may be formed of wire of suitable gauge, the ends being inserted through holes 11 and spacing upsets 12 provided in the inside of the expander members and retaining upsets 13 at the outer sides thereof.

When the expander is driven into seating position within a piston, the expander members are placed under expanding spring stress and their abutting portions 6 urged frictionally against one another. When this is installed a very substantial snubbing action results not only between the expander members and the piston wall but also a frictional snubbing action between the abutting members 6. This is a very desirable feature and reduces the objectionable "breathing" action which results from some expanders when used in thin walled pistons particularly the modern steel and cast iron pistons as such pistons are reciprocated in substantially worn cylinders. The piston is, however, effectively expanded and resized.

A further advantage is that the expander is very firmly seated and although the abutment engaging seats 7 are of substantial depth, the expander members may be driven into seating position without placing undue stress on the expander in this operation.

I have illustrated and described my improvements in an embodiment which I have found to be very practical from the economy of manufacture, ease of installation, security when installed, and effectiveness in use.

I have not attempted to illustrate certain modifications or adaptations which might be desirable for pistons having certain modifications in structure as it is believed that this disclosure will enable those skilled in the art to embody or adapt my improvements as may be desired.

Having thus described my invention, what I claim as new and desire to secure by Letters Patent is:

1. A piston expander comprising a pair of relatively wide blade-spring expander members having inwardly curved piston wall engaging portions at their outer ends terminating in inturned mutually abutting and supporting ends, the said curved piston wall engaging portions approximating the piston skirt in length, and a tie rod connecting the inner ends of said expander members, the inner edges of said expander members having piston pin boss receiving seats of substantial depth, the inner edges of the expander members at the inner sides of said seats being inclined to facilitate the expander members being driven into a piston to engage said seats with the piston pin bosses of a piston whereby the expander members are placed under expanding and retaining stress with their curved outer ends in snubbing thrust engagement with the cylinder wall and their inturned abutting ends in thrust snubbing engagement with each other.

2. A piston expander comprising a pair of relatively wide blade-spring expander members having inwardly curved piston wall engaging portions at their outer ends, the said curved piston wall engaging portions approximating the piston skirt in length, and a tie rod connecting the inner ends of said expander members permitting independent action of their outer ends, the inner edges of said expander members having piston pin boss receiving seats, whereby their curved outer ends are placed in snubbing thrust engagement with the cylinder wall and their inturned abutting ends in thrust snubbing engagement with each other when their said seats are engaged with the pin bosses of a piston.

3. A piston expander comprising a pair of blade-spring expander members having inwardly curved outer ends merging into curved piston wall engaging portions for engagement with a piston wall axially thereof and of such area as to provide a substantial snubbing engagement with a piston wall in which the expander is installed, said piston wall engaging portions being extended into inturned mutually abutting and supporting ends having frictional snubbing engagement, the inner edges of said expander members having abutment engaging seats, the inner abutment engaging ends of the expander members being spaced substantially greater than their outer piston wall engaging portions, and spacing means for the inner ends of said expander members positioned to permit independent flexing movement of their outer ends.

4. A piston expander comprising a pair of blade-spring expander members having curved piston wall engaging portions at their outer ends of substantial area for engagement with a piston wall axially thereof, and coacting abutting portions adjacent said curved piston wall engaging portions, and spacing means for the inner ends of said expander members acting to prevent spreading thereof and also collapsing toward one another, while permitting independent adjustment and flexing movement of their outer ends, said expander members having abutment receiving seats of substantial depth in their inner edges, their inner edges at the inner side of the said seats being inclined to facilitate the expander members being driven into a piston to engage said seats with parts of a piston constituting abutment members.

5. A piston expander comprising a pair of blade-spring expander members having curved piston wall engaging portions at their outer ends of substantial area for engagement with a piston wall axially thereof, and coacting abutting portions adjacent said curved piston wall engaging portions, and spacing means for the inner ends of said expander members acting to prevent spreading thereof and also collapsing toward one another, while permitting independent adjustment and flexing movement of their outer ends, said expander members having abutment receiving seats in their inner edges.

6. A piston expander comprising a pair of blade-spring expander members having curved piston wall engaging portions at their outer ends of substantial area for engagement with a piston wall axially thereof, and coacting abutting portions adjacent said curved piston wall engaging portions, and spacing means for the inner ends of said expander members abuttingly engageable with adjacent sides of said inner ends and strainingly engageable with the opposite remote sides thereof to prevent outward spreading or inward collapse of said expander members, while permitting independent adjustment and flexing movement of their outer ends, said expander members having abutment receiving seats of substantial depth in their inner edges, their inner edges at the inner side of the said seats being inclined to facilitate the expander members being driven into a position to engage said seats with parts of a piston constituting abutment members.

7. A piston expander comprising a pair of blade-spring expander members having curved piston wall engaging portions at their outer ends of substantial area for engagement with a piston wall axially thereof, and coacting abutting portions adjacent said curved piston wall engaging portions, and spacing means for the inner ends of said expander members abuttingly engageable with adjacent sides of said inner ends and strainingly engageable with the opposite remote sides thereof to prevent outward spreading or inward collapse of said expander members, while permitting independent adjustment and flexing movement of their outer ends, said expander members having abutment engaging portions on their inner edges.

HAROLD P. PHILLIPS.